(12) United States Patent
Shibata et al.

(10) Patent No.: US 8,820,804 B2
(45) Date of Patent: Sep. 2, 2014

(54) VEHICLE END SECTION STRUCTURE

(75) Inventors: Keisuke Shibata, Miyoshi (JP); Naoya Kosaka, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/817,235

(22) PCT Filed: Mar. 25, 2011

(86) PCT No.: PCT/JP2011/057463
§ 371 (c)(1),
(2), (4) Date: Feb. 15, 2013

(87) PCT Pub. No.: WO2012/131855
PCT Pub. Date: Oct. 4, 2012

(65) Prior Publication Data
US 2014/0015264 A1  Jan. 16, 2014

(51) Int. Cl.
*B60R 19/18*  (2006.01)
*B60R 19/24*  (2006.01)
*B60R 19/48*  (2006.01)
*B60D 1/56*  (2006.01)

(52) U.S. Cl.
CPC ......... *B60R 19/48* (2013.01); *B60R 2019/1806* (2013.01); *B60R 19/24* (2013.01); *B60R 2019/247* (2013.01); *B60R 19/18* (2013.01); *B60D 1/56* (2013.01)
USPC ....... 293/117; 293/133; 293/154; 296/187.09

(58) Field of Classification Search
CPC .......... B60R 19/34; B60R 19/18; B60R 19/02
USPC ............ 296/187.09; 293/102, 117, 121, 122, 293/133, 154; 280/495, 500
See application file for complete search history.

(56) References Cited

U.S. PATENT DOCUMENTS

| | | | |
|---|---|---|---|
| 6,814,381 B1 * | 11/2004 | Frank | 293/133 |
| 7,210,719 B2 * | 5/2007 | Honda et al. | 293/155 |
| 8,678,423 B1 * | 3/2014 | Hwang | 280/495 |
| 2003/0052493 A1 * | 3/2003 | Ponsonnaille et al. | 293/102 |
| 2004/0041416 A1 * | 3/2004 | Harrison et al. | 293/117 |

(Continued)

FOREIGN PATENT DOCUMENTS

| | | |
|---|---|---|
| DE | 44 09 290 A1 | 9/1995 |
| DE | 10 2004 056 249 A1 | 5/2006 |

(Continued)

*Primary Examiner* — Jason S Morrow
(74) *Attorney, Agent, or Firm* — Oliff PLC

(57) ABSTRACT

A vehicle end section structure capable of securing coupling rigidity at a coupling section between bumper reinforcement and a framework member where a hook attachment section is provided. The vehicle front section structure includes bumper reinforcement of B-shaped cross-section formed with a rearwards opening indented portion between a top and bottom pair of closed cross-sections, a crush box disposed at the rear of one length direction end portion of the bumper reinforcement, bolts and weld nuts for joining the bumper reinforcement at the top-bottom closed cross-sections to locations inside the closed cross-section of the crush box as viewed along the front-rear direction, and a pipe nut that is disposed in an indented portion facing an access hole to enable access to a hook member through the access hole and that is fixed to the crush box inside the closed cross-section of the crush box as viewed along the front-rear direction.

3 Claims, 8 Drawing Sheets

(56) References Cited

U.S. PATENT DOCUMENTS

| | | | |
|---|---|---|---|
| 2005/0212311 A1* | 9/2005 | Haneda et al. | 293/117 |
| 2008/0001383 A1 | 1/2008 | Hodoya et al. | |
| 2008/0284183 A1* | 11/2008 | Johnson | 293/102 |
| 2009/0206617 A1* | 8/2009 | Ahlin | 293/117 |
| 2012/0066979 A1* | 3/2012 | Brown | 293/102 |
| 2012/0292930 A1* | 11/2012 | Hermanson et al. | 293/102 |
| 2013/0099514 A1* | 4/2013 | Kaneko et al. | 293/133 |
| 2014/0021729 A1* | 1/2014 | Kosaka et al. | 293/133 |

FOREIGN PATENT DOCUMENTS

| | | |
|---|---|---|
| EP | 2 261 086 A1 | 12/2010 |
| JP | A-11-245741 | 9/1999 |
| JP | A-2000-198401 | 7/2000 |
| JP | A-2003-312401 | 11/2003 |
| JP | A-2004-338666 | 12/2004 |
| JP | A-2007-283868 | 11/2007 |
| JP | A-2008-7044 | 1/2008 |
| JP | A-2009-248602 | 10/2009 |
| JP | A-2009-255900 | 11/2009 |
| JP | A-2009-292175 | 12/2009 |
| JP | A-2010-47226 | 3/2010 |
| JP | A-2010-228512 | 10/2010 |
| WO | WO 2011/125223 A1 | 10/2011 |

* cited by examiner

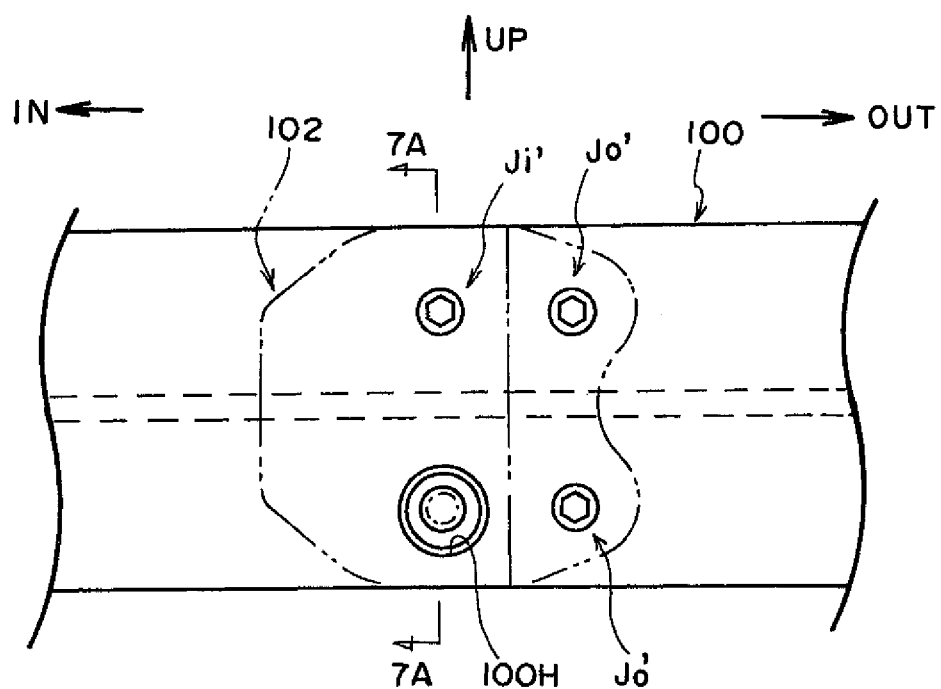

VEHICLE END SECTION STRUCTURE

TECHNICAL FIELD

The present invention relates to a vehicle end section structure equipped with bumper reinforcement.

BACKGROUND ART

Structures are known wherein a towing hook attachment section is disposed at a coupling section between bumper reinforcement and a front side member (see for example Japanese Patent Application Laid-Open (JP-A) No. 2009-292175). In such structures, it is difficult to secure numerous coupling points between the front side member and the bumper reinforcement inside a closed cross-section of the front side member. Structures are also known for reinforcing an attachment portion for attaching a towing hook to a bumper reinforcement (see for example JP-A No. 2008-7044). Bumper reinforcements are also known that have a B-shaped cross-section profile formed by an indented portion between top and bottom closed cross-section portions (see for example JP-A No. 11-245741, JP-A No. 2000-198401 and JP-A No. 2009-248602).

DISCLOSURE OF INVENTION

Technical Problem

An object of the present invention is to obtain a vehicle end section structure capable of securing coupling rigidity in a coupling section between a bumper reinforcement and a framework member where a hook attachment section is provided.

Solution to Problem

A vehicle end section structure according to a first aspect of the present invention includes: a bumper reinforcement including an outside member and an inside member having respective length directions along the vehicle width direction, with the inside member joined, at a vehicle front-rear direction center side, to the outside member such that an indented portion opening towards the center side is formed between a pair of closed cross-section portions that are formed and separated from each other in the vehicle top-bottom direction; a framework member of closed cross-section structure, having a length direction along the vehicle front-rear direction and being disposed at one length direction end side of the bumper reinforcement on an inside member side in the vehicle front-rear direction; a top and bottom pair of joining units that join the bumper reinforcement, at portions of the inside member configuring the respective pair of closed cross-section portions, to the framework member at portions positioned inside a closed cross-section of the framework member as viewed along the vehicle front-rear direction; and a hook attachment section fixed to a front end side of the framework member and being configured to be accessible along the vehicle front-rear direction via through holes that are formed at portions of the inside member and the outside member which configure an indentation-bottom of the indented portion.

According to the above aspect, in the bumper reinforcement, a closed cross-section portion, an indented portion and a closed cross-section portion are formed in sequence from the top, as viewed in cross-section orthogonal to the length direction of the bumper reinforcement. The bumper reinforcement is joined, at the top and bottom closed cross-section portions, to inside the closed cross-sections of the framework member by the respective joining units as viewed along the front-rear direction. Coupling rigidity to the framework member is accordingly higher than in cases where the bumper reinforcement is joined to the framework member at a single location inside the closed cross-section of the framework member. Configuration is made such that the hook attachment section fixed to the framework member can be accessed from a front side of the bumper reinforcement through the through holes and the indented portion, and the top and bottom joining units and the hook attachment section are disposed offset in a top-bottom direction. Accordingly, a configuration is achieved whereby the top and bottom joining units can be disposed inside the closed cross-section of the framework member without making the closed cross-section of the framework member larger in the top and bottom direction.

According to the vehicle end section structure of the above aspect, coupling rigidity of the coupling section between the bumper reinforcement and the framework member can be secured where a hook attachment section is provided.

In the above aspect, the bumper reinforcement may be configured such that the portions of the inside member and the outside member which configure the indentation-bottom of the indented portion are positioned at a vehicle front-rear direction outside end portion of the bumper reinforcement; and dimensions and shape of the through holes are set such that, when a top-bottom direction load of a specific value or greater acts on a hook member attached to the hook attachment section, the hook member makes contact with hole edges of the through holes of the inside member and the outside member such that a portion of the load is supported.

According to the above aspect, when a top-bottom direction load or a vehicle width direction load acts on the hook member attached to the hook attachment section, the hook member displaces in the load input direction and makes contact with hole edges of the through holes in the inside member and the outside member and is supported. The portions where the inside member and the outside member which configure the indentation-bottom of the indented portion, namely the portions where the through holes are formed, are positioned at the outermost side of the cross-section of the bumper reinforcement. A support span length for the hook member from the hook attachment section to the hole edges of the through holes is therefore achieved to be long. Deformation of the hook member in the load direction is accordingly suppressed. Deformation of the bumper reinforcement due to load from the hook member is also suppressed since the hole edges of the through holes have a high rigidity (are reinforced) due being configured at the portion where the plates of the inside member and the outside member are placed against each other. This also contributes to suppressing the displacement of the hook member in the load input direction referred to above.

In the above aspect, configuration may be made wherein: the joining units and the hook attachment section are disposed offset from each other in the vehicle width direction; and the portion of the inside member forming the indented portion is formed larger in the top and bottom direction at a placement area of the hook attachment section than at other portions of the indented portion; and a portion, in the front-rear direction, of the hook attachment section is inserted inside the indented portion.

According to the above aspect, due to setting a dimension in the top-bottom direction of the indented portion larger where the hook attachment section is attached, a placement space for the hook attachment section that has a portion inserted inside the indented portion is secured while still securing bending rigidity of the bumper reinforcement. The top and bottom pair of joining units is offset in the vehicle width direction with respect to the hook attachment section. Thus few restrictions are imposed for placement of the joining units in the top-bottom direction due to attaching the hook attachment section. That is to say, an effective contribution is made for disposing the top and bottom pair of joining units inside the closed cross-section of the framework member without making the closed cross-section of the framework member larger in the top and bottom direction.

In the above aspect, configuration may be made wherein the bumper reinforcement is formed larger in the top-bottom direction at the portion where the indented portion is formed larger in the top-bottom direction than at other portions, and the top and bottom pair of joining units is disposed at the portion that is formed larger in the bumper reinforcement.

According to the above aspect, the pair of joining units are respectively disposed at portions that has a larger top-bottom dimension within the cross-section formed by the pair of closed cross-sections and the indented portion. The separation between the top and bottom joining units can accordingly be made larger, and a contribution is made to improving the coupling rigidity of the coupling section between the bumper reinforcement and the framework member.

Advantageous Effects of Invention

The vehicle end section structure according to the present invention as described above exhibits the excellent advantageous effect of being able to secure coupling rigidity of the coupling section between the bumper reinforcement and the framework member in a configuration wherein the hook attachment member is provided to the coupling section.

BRIEF DESCRIPTION OF DRAWINGS

FIG. 7B is a front elevation illustrating a Comparative Example to an exemplary embodiment of the present invention.

BEST MODE FOR CARRYING OUT THE INVENTION

Figure 1:
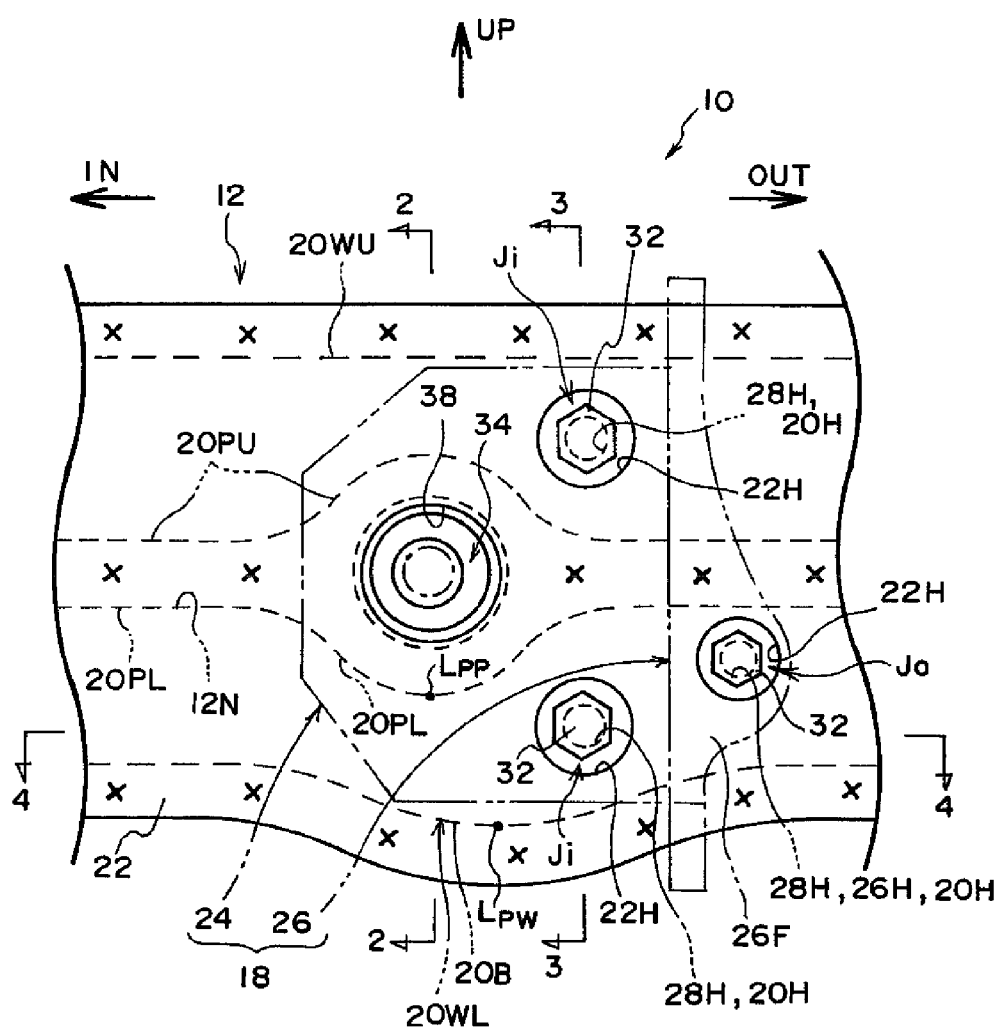
FIG. 1 is an enlarged front elevation illustrating relevant portions of a vehicle end section structure according to an exemplary embodiment of the present invention.

Explanation follows regarding a vehicle front section structure 10 serving as a vehicle end section structure according to a first exemplary embodiment of the present invention, with reference to FIG. 1 to FIG. 6. Note that in the drawings, an arrow FR indicates a vehicle front-rear direction front direction, an arrow UP indicates the vehicle top-bottom direction top direction, an arrow IN indicates the vehicle width direction inside, and an arrow OUT indicates the vehicle width direction outside, as appropriate. In the following explanation, unless specifically indicated, references to the front and rear, and top and bottom directions refer to the vehicle front-rear direction front and rear, and the vehicle top-bottom direction top and bottom.

Figure 5:
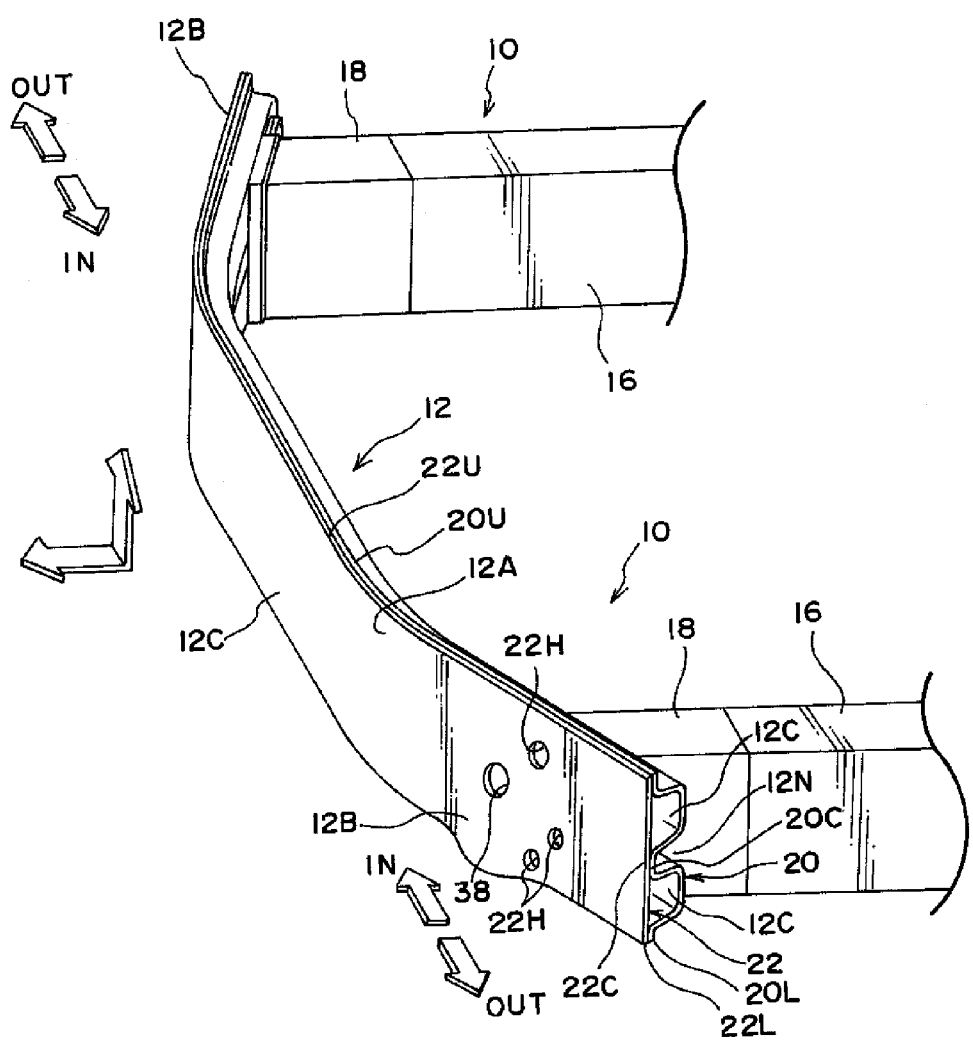
FIG. 5 is a perspective view illustrating an outline overall configuration of a vehicle end section structure according to an exemplary embodiment of the present invention.

FIG. 5 is a perspective view of main relevant portions of the vehicle front section structure 10. As shown in this diagram, the vehicle front section structure 10 includes bumper reinforcement 12 that has a length direction along the vehicle width direction and configures a front bumper framework member. The bumper reinforcement 12 configures a front bumper that is covered from the vehicle front by a bumper cover, not shown in the drawings.

The bumper reinforcement 12 is supported in the vicinity of two vehicle width direction ends by front side members 16 that configure a left and right pair of vehicle body framework sections. In the present exemplary embodiment, the bumper reinforcement 12 has curved portions 12A configured by curved portions that curve around towards the vehicle rear in the vicinity of the two vehicle width direction ends and inclined portions 12B positioned at the width direction outside of the curved portions 12A. Note that the bumper reinforcement 12 may be formed with an overall arc shape in plane view. For convenience explanation (and illustration) follows for a case in which the bumper reinforcement 12 is formed in a straight line shape along the vehicle width direction.

The pair of front side members 16 is coupled through crush boxes 18 to the inclined portions 12B which are positioned on the same respective sides from the vehicle width direction center. The crush box 18 accordingly corresponds to the framework member of the present invention. Explanation follows regarding the coupling structure of the front side members 16 to the crush boxes 18.

Figure 2:
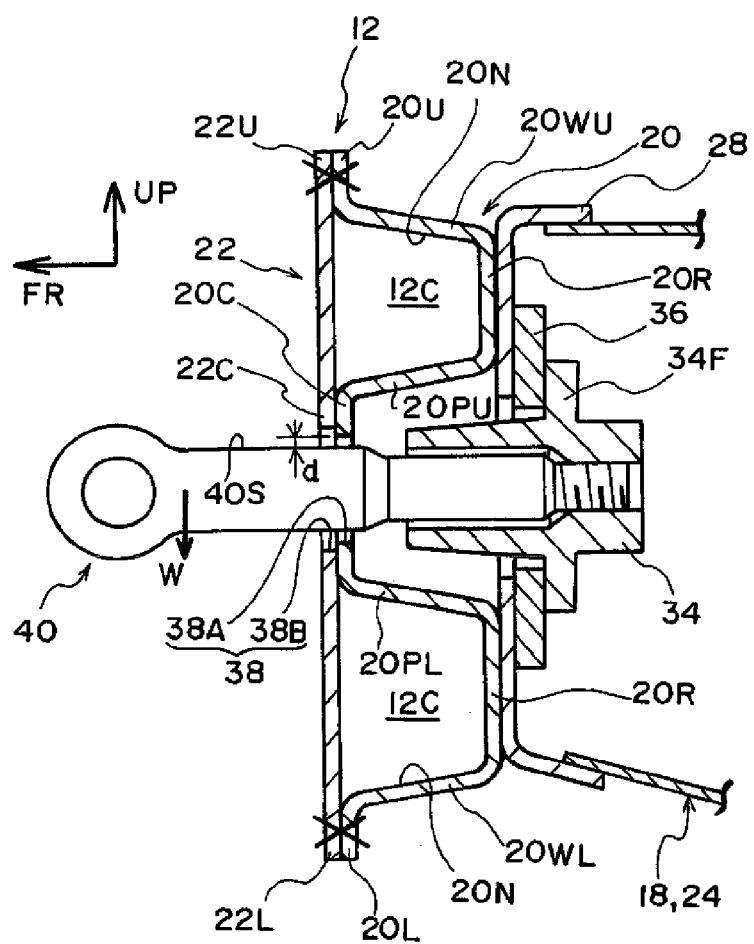
FIG. 2 is a cross-section taken on line 2-2 of FIG. 1 illustrating a vehicle end section structure according to an exemplary embodiment of the present invention.
Figure 3:
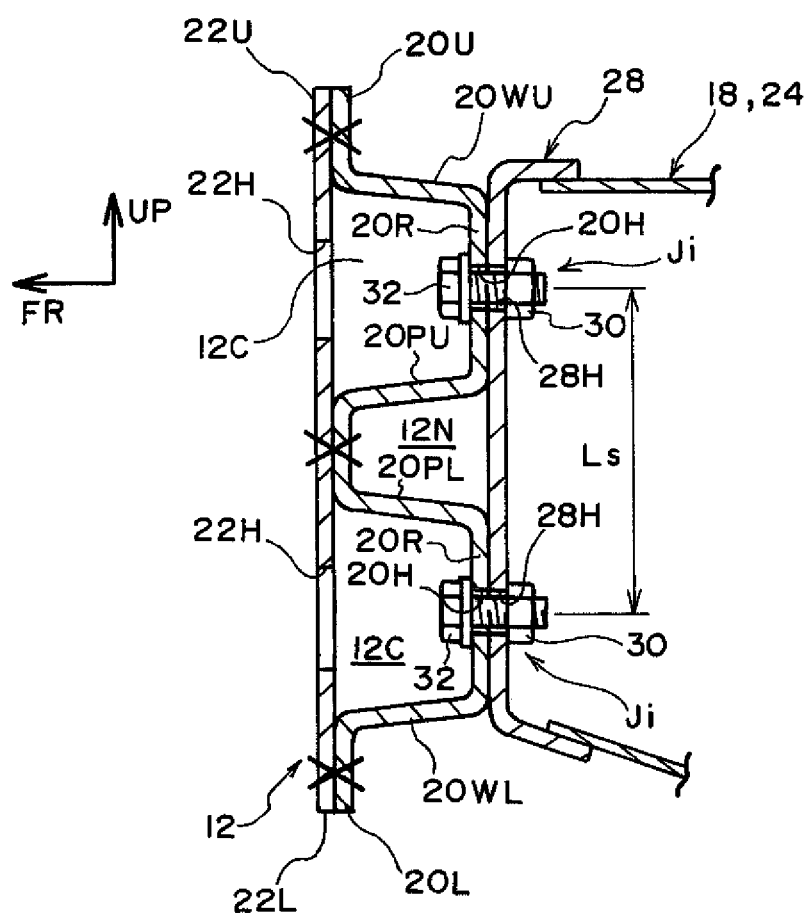
FIG. 3 is a cross-section taken on line 3-3 of FIG. 1 illustrating a vehicle end section structure according to an exemplary embodiment of the present invention.

As shown in FIG. 2 and FIG. 3, the bumper reinforcement 12 employs a two member configuration formed by joining together an inner panel 20 serving as an inside member and an outer panel 22 serving as an outside member. The inner panel 20 includes an upper flange 20U, a lower flange 20L, and an intermediate flange 20C, each respectively serving as joint sections. Indented portions 20N with U-shaped cross-sections opening forwards are formed respectively between the upper flange 20U and the intermediate flange 20C and between the intermediate flange 20C and the lower flange 20L.

The inner panel 20 is formed by press working sheet steel. An indentation portion 12N, described later, with a rearward facing opening is accordingly formed to the inner panel 20A between the top and bottom indented portions 20N. Namely, the inner panel 20 is configured as if two members with hat shaped cross-sections had been connected together one on top of the other.

In the present exemplary embodiment, the upper flange 20U, the lower flange 20L, and the intermediate flange 20C of the inner panel 20 are formed in substantially the same plane as each other so as to be positioned in the same front-rear direction position, in each cross-section orthogonal to a length direction. Hence configuration is such that the upper flange 20U, the lower flange 20L and the intermediate flange 20C are positioned at the foremost section of the inner panel 20.

The outer panel 22 includes a upper flange 22U joined to the upper flange 20U, a lower flange 22L joined to the lower flange 20L, and an intermediate flange 22C joined to the intermediate flange 20C. Wall portions 22W, in combination with the respective indented portions 20N, configure closed cross-sections 12C formed between the upper flange 22U and the intermediate flange 22C and between the intermediate flange 22C and the lower flange 22L. In the present exemplary embodiment, the wall portions 22W are disposed along the open faces of the indented portions 20N, and close off the openings of the indented portions 20N. The outer panel 22 is accordingly configured in cross-section viewed from the side with the upper flange 22U, the intermediate flange 22C, the lower flange 22L and the top and bottom wall portions 22W disposed on the same straight line running along the vertical direction. In the present exemplary embodiment, the outer panel 22 is configured in a cross-section viewed from the side with a flat plate shape without front-rear undulations.

The bumper reinforcement 12 is configured by respectively joining together the upper flange 20U and the upper flange 22U, the lower flange 20L and the lower flange 22L and the intermediate flange 20C and the intermediate flange 22C by spot welding. The locations marked with "x" in FIG. 1 and FIG. 3 indicate the locations where spot welds have been made.

In the bumper reinforcement 12 as described above is formed with a cross-section profile ("B" shaped cross-section) in which the indented portion 12N opening rearwards is formed between the top and bottom closed cross-sections 12C.

Joint Structure of the Bumper Reinforcement to the Crush Boxes

The bumper reinforcement 12 as explained above is fixed to the front end of the crush boxes 18 by fastening. More specific explanation follows.

First, supplementary explanation follows regarding configuration of the crush boxes 18. As shown in FIG. 1, the crush boxes 18 are given a closed cross-section structure viewed in cross-section orthogonal to the length (front-rear) direction by joining together inner panels 24 and outer panels 26. In the present exemplary embodiment, the inner panels 24 have substantially hat shaped cross-section profiles open towards the vehicle width direction outside, and the outer panels 26 have straight line cross-sections running along the top-bottom direction. The top and bottom flanges of the inner panels 24 and the top and bottom ends of the outer panels 26 are joined together by joint portions 18J formed for example by spot welding, thereby achieving the closed cross-section structure described above.

Figure 4:
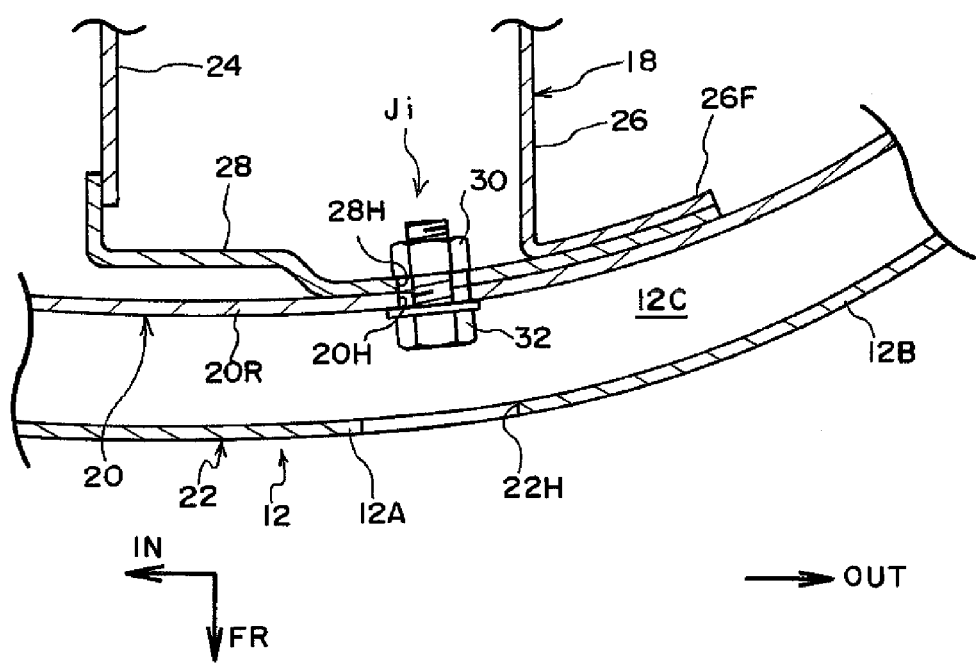
FIG. 4 is a cross-section taken on line 4-4 of FIG. 1 illustrating a vehicle end section structure according to an exemplary embodiment of the present invention.

The front ends of the crush boxes 18 are closed off by cover members 28, as shown in FIG. 2 to FIG. 4. The cover members 28 are joined such as by welding to the outer peripheral edges of the inner panels 24 and to front flanges 26F that jut out towards the vehicle width direction outside from front ends of the outer panels 26.

As shown in FIG. 1, the bumper reinforcement 12 is fastened to the crush box 18 at a total of 3 individual locations, two locations inside the closed cross-section of the crush box 18 as viewed from the vehicle front, and one location on the front flanges 26F outside the closed cross-section. As shown in FIG. 3, a top and bottom pair of fastening holes 28H are formed in portions of the cover members 28 employed to close off the closed cross-section of the crush box 18. Weld nuts 30 are fixed to the rear face side of the cover members 28 such that female threads (thread holes) are coaxial to the fastening holes 28H.

Fastening holes 20H are formed in the inner panel 20 configuring the bumper reinforcement 12 in rear walls 20R forming the indentation-bottoms of the top and bottom indented portions 20N, so as to be coaxial to the fastening holes 28H. Access holes 22H are also formed in the outer panel 22 so as to be coaxial to the fastening holes 28H (the weld nuts 30) and the fastening holes 20H. In the present exemplary embodiment, the top and bottom fastening holes 28H, 20H and the access holes 22H are disposed at the same positions in the vehicle width direction as each other.

Bolts 32 are inserted through the access holes 22H into the closed cross-sections 12C, and screwed to the weld nuts 30 through the fastening holes 20H, 28H. The bumper reinforcement 12 is thereby joined to the crush box 18 at two locations of joint portions Ji situated inside the closed cross-section of the crush box 18. Therefore, in the present exemplary embodiment, fastening units including the weld nuts 30 and the bolts 32 correspond to the joining units of the present invention. A configuration is also achieved in which objects such as fastening tools are insertable into the closed cross-sections 12C through the access holes 22H. In the present exemplary embodiment, as shown in FIG. 1, the two locations of the joint portions Ji are disposed at vehicle width direction outside portions in the closed cross-section of the crush box 18.

While not shown in the cross-sections, outside the closed cross-section of the crush box 18, fastening holes 26H, 28H (see FIG. 1) are formed piercing respectively through the front flange 26F and the cover member 28 that have been joined together, and a weld nut, not shown in the drawings, is fixed to the rear face of the front flange 26F. A fastening hole 20H is also formed in the rear wall 20R configuring the indentation-bottom of the indented portion 20N at the bottom side of the inner panel 20 so as to be coaxial to the fastening holes 26H, 28H. An access hole 22H is also formed in the outer panel 22 coaxially to the fastening hole 20H. A bolt 32 is inserted into the closed cross-sections 12C through the access hole 22H, and screwed into the weld nut through the fastening holes 20H, 28H, 26H. The bumper reinforcement 12 is thereby joined to the crush box 18 at one location of joint portion Jo at the outside of the closed cross-section of the crush box 18.

Flange Attachment Structure

As shown in FIG. 1 and FIG. 2, a pipe nut 34 serving as hook attachment section is fixed to the front end of the crush box 18. The pipe nut 34 is only provided to one of the crush boxes 18 (on the vehicle left side in the present exemplary embodiment). Specifically, the pipe nut 34 is fixed to the portion of the cover member 28 that closes off the closed cross-section of the crush box 18, with a reinforcement plate 36 interposed therebetween. Namely, as viewed from the front as in FIG. 1, the pipe nut 34 is disposed inside the closed cross-section of the crush box 18. The pipe nut 34 is disposed offset to the vehicle width direction inside with respect to the top and bottom joint portions Ji.

As shown in FIG. 2, in a state in which the pipe nut 34 has been inserted through a through hole formed in the cover member 28 and the reinforcement plate 36, the pipe nut 34 is joined to the rear face of the reinforcement plate 36 at a flange 34F formed at a front-rear direction central portion of the pipe nut 34. The front portion of the pipe nut 34 is inserted inside the indented portion 12N in this state. In order to secure placement space for the pipe nut 34, the top-bottom dimension of the indented portion 12N is made larger at the placement location of the pipe nut 34 than at other portions of the indented portion 12N, as shown in FIG. 1.

More specifically, the bumper reinforcement 12 has top and bottom partitioning walls 20PU, 20PL that partition into the indented portions 20N (the closed cross-sections 12C) and the indented portion 12N of the inner panel 20. The partitioning walls 20PU, 20PL curve around the outer periphery of the pipe nut 34. The indented portion 12N accordingly has a locally enlarged top-bottom dimension as described above.

In the bumper reinforcement 12, the top-bottom dimension of the closed cross-section 12C at the top side of the pipe nut 34 is reduced, and expanded space for the indented portion 12N is secured. Namely, an upper wall 20WU that defines the top end of the topside indented portion 20N (the closed cross-section 12C) is made substantially flat. However, in the bumper reinforcement 12 at the bottom side of the pipe nut 34, expanded space is secured in the indented portion 12N while still maintaining the same top-bottom dimension for the indented portion 20N (the closed cross-section 12C) or while suppressing any reduction in the top-bottom dimension, in comparison to at the top side. Namely, a lower wall 20WL that defines the bottom end of the bottom side indented portion 20N (the closed cross-section 12C) is configured by a curved portion 20B that curves around to follow the curved portion of the partitioning wall 20PL.

Consequently, the bumper reinforcement 12 is configured to have an enlarged part in a top-bottom direction within a range in the vehicle width direction that includes the placement location of the pipe nut 34. The top and bottom joint portions Ji are disposed in the bumper reinforcement 12 within the range of enlarged top-bottom dimension, and a support span Ls (see FIG. 3) is configured to be longer than in cases where the joint portions Ji are disposed in an ordinary portion of the bumper reinforcement 12. In the present exemplary embodiment, the top and bottom joint portions Ji are disposed in the range of enlarged top-bottom dimension by providing a point Lpw that is the lowest location of the curved portion of the lower wall 20WL at the vehicle width direction outside than a point Lpp that is the lowest location of the curved portion of the partitioning wall 20PL.

Figure 6:
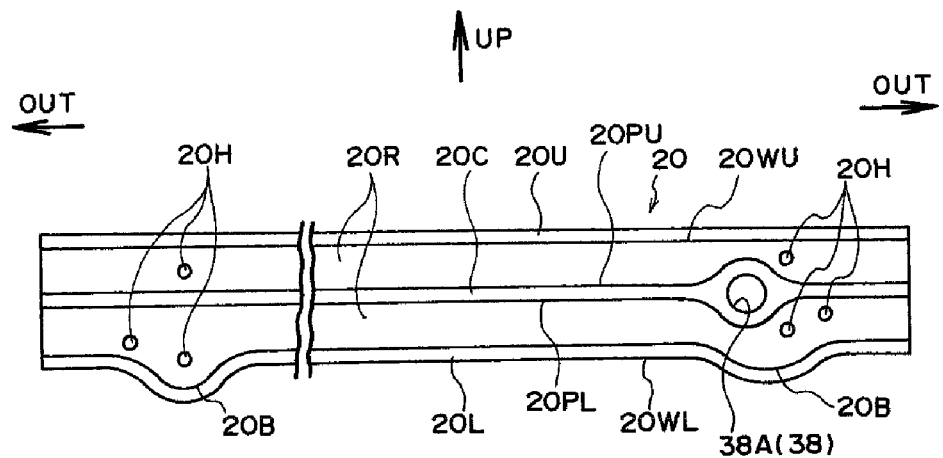
FIG. 6 is a front elevation of an inner panel configuring a vehicle end section structure according to an exemplary embodiment of the present invention.

As shown only the inner panel 20 in FIG. 6, a curved portion 20B is also formed protruding downwards at the 20WL in the bumper reinforcement 12 on the vehicle right side where the pipe nut 34 is not disposed. Consequently, the joint structure of the bumper reinforcement 12 to the left and right crush boxes 18 (the placement of the respective 3 joint portions Ji, Jo) is symmetrical. The lower flange 20L and the outer panel 22 are also curved to follow the curved profile of the lower wall 20WL.

As shown in FIG. 1 and FIG. 2, an access hole 38 is formed in the bumper reinforcement 12 to give access for the pipe nut 34. The access hole 38 is configured by respectively forming through holes 38A, 38B in the intermediate flange 20C of the inner panel 20 and the intermediate flange 22C of the outer panel 22 that form the indentation-bottom of the indented portion 12N. In the present exemplary embodiment, the through hole 38A on the inner panel 20 side is formed coaxially and with a slightly smaller diameter to the through hole 38B in the outer panel 22.

Namely, a hole edge of the through hole 38A in the inner panel 20 is positioned closer to a peripheral face 40S of a hook member 40 that is fixed by screwing into the pipe nut 34 than a hole edge of the through hole 38B in the outer panel 22. The gap between the hole edge of the through hole 38A of the inner panel 20 and the peripheral face 40S of the hook member 40 is determined so as to be a specific separation d. This specific separation is set such that the hole edge of the through hole 38A of the inner panel 20 and the peripheral face 40S of the hook member 40 make contact with each other when a specific load W acts on the hook member 40 in the top-bottom direction or in the vehicle width direction. The specific load W is set, for example in cases where the hook member 40 is a shipping fixing hook for securing a vehicle during shipping, based on the fixing load acting downwards.

Explanation follows regarding operation of the present exemplary embodiment.

In the vehicle front section structure configured as described above, the bumper reinforcement 12 is joined to the crush box 18 at the two locations of joint portions Ji inside the closed cross-section of the crush box 18 and at the one location joint portion Jo outside the closed cross-section, as viewed from the front. Accordingly, in the vehicle front section structure 10, the coupling rigidity of the bumper reinforcement 12 to the crush box 18 is higher than in the Comparative Example illustrated in FIG. 7A and FIG. 7B.

Figure 7A:
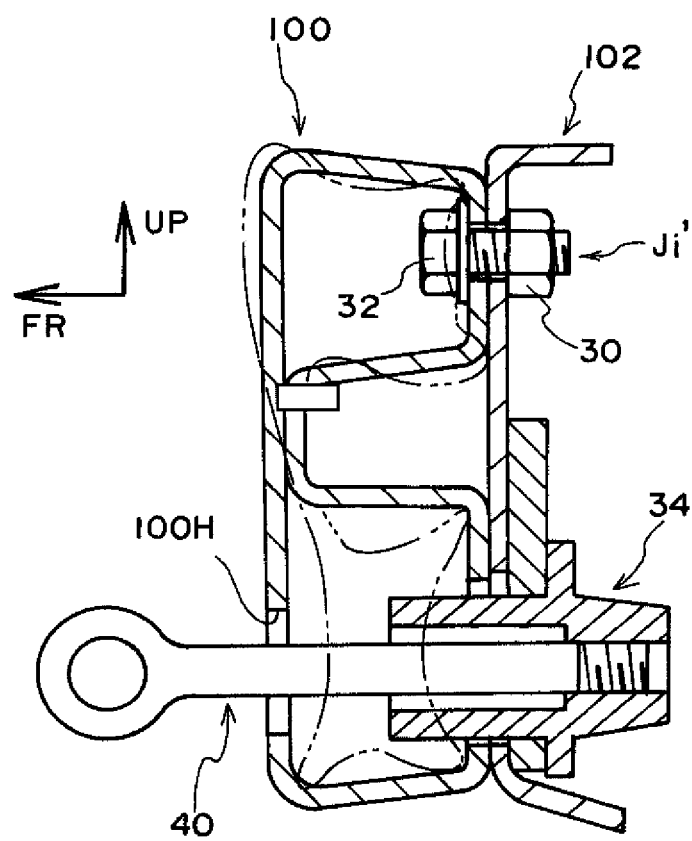
FIG. 7A is cross-section taken along line 7A-7A of FIG. 7B illustrating a Comparative Example to an exemplary embodiment of the present invention.

In the Comparative Example illustrated in FIG. 7A and FIG. 7B, bumper reinforcement 100 with a B-shaped cross-section formed by rolling is joined to a crush box 102 at a joint portion Ji' at one location inside the closed cross-sections of the crush box 102 and at joint portions Jo' at two locations outside the closed cross-sections, as viewed from the front. In the crush box 102, a pipe nut 34 is fixed below the joint portion Ji', namely the pipe nut 34 is fixed inside the closed cross-section of the crush box 102 at the rear of a closed cross-section 12C at the bottom side of the bumper reinforcement 100. In the Comparative Example, having the one location of the joint portion Ji' inside the closed cross-section of the crush boxes 102 makes it difficult to secure the coupling rigidity of the bumper reinforcement 100 to the crush box 102.

In contrast, in the vehicle front section structure 10, there are the two locations of joint portions Ji set as described above, and the coupling rigidity of the bumper reinforcement 12 to the crush box 18 is raised in comparison to the above Comparative Example. In particular, in the vehicle front section structure 10, one of the joint portions Si is disposed in an area where the lower wall 20WL is set to have the curved portion 20B so as to correspond to the enlarged portion in the top-bottom dimension of the indented portion 12N of the bumper reinforcement 12. Therefore, in comparison to a configuration lacking the curved portion 20B, a longer support span Ls between the top and bottom joint portions Ji can be provided, and the coupling rigidity of the bumper reinforcement 12 to the crush box 18 is further raised.

Due to the above features, the bumper reinforcement 12 has raised rigidity to front-rear bending, top-bottom bending, and twisting compared to the bumper reinforcement 100 according to the Comparative Example. The vehicle front section structure 10 accordingly suppresses front-rear bending, top-bottom bending, and twisting of the bumper reinforcement 12 accompanying vehicle travel, and hence contributes to raising handling stability for the vehicle to which the bumper reinforcement 12 is applied.

In the Comparative Example illustrated in FIG. 7, due to there being only the one location of joint portion Ji' inside the closed cross-section of the crush box 102, out-of-plane deformation may occur to the bumper reinforcement 100 (see the intermittent line in FIG. 7A) during a frontal collision to the bumper reinforcement 100. In particular, large out-of-plane deformation might occur at the wall forming the closed cross-section 12C at the bottom side where the joint portion Ji' is not provided. The Comparative Example hence requires counter-measures to be taken, such as increasing the sheet thickness of the panel configuring the bumper reinforcement 100.

In contrast, in the vehicle front section structure 10, the top and bottom closed cross-sections 12C of the bumper reinforcement 12 are firmly fixed to the crush box 18 at the two locations of the joint portions Ji disposed inside the closed cross-section of the crush box 18. Out-of-plane deformation of the bumper reinforcement 12 accordingly does not readily occur in response to a frontal collision. The bumper reinforcement 12 can hence efficiently transmit the collision load to the crush box 18 and the front side members 16 while maintaining its cross-section profile during the collision. Namely, the bumper reinforcement 12 can exhibit required crashworthiness without having to rely on increasing the wall thickness of the inner panel 20 and the outer panel 22 (without increasing weight).

In addition, in the Comparative Example illustrated in FIG. 7, there is a contribution to reducing deformation in response to load W on the hook member 40 attached to the pipe nut 34 due to the pipe nut 34 being disposed within the closed cross-section of the crush boxes 102. However, in the bumper reinforcement 100, support rigidity for the hook member 40 by the bumper reinforcement 100 (the panel configured therefrom) is liable to be insufficient after the hook member 40 has made contact with the hole edges of an access hole 100H.

In contrast thereto, in the vehicle front section structure 10, the pipe nut 34 is disposed inside the closed cross-section of the crush box 18, and so there is a contribution to reducing deformation in response to load W on the hook member 40 attached to the pipe nut 34. Further, the hook member 40, which has been displaced by load W, makes contact a portion where the intermediate flanges 20C, 22C are superimposed on each other (a thick walled section), and therefore, support rigidity for the hook member 40 is raised in comparison to the Comparative Example. Namely, an intermediate portion of the hook member 40 can be firmly supported by a high rigidity location where the intermediate flanges 20C, 22C mutually reinforce each other.

In particular, in the bumper reinforcement 12, the intermediate flanges 20C, 22C are positioned at the foremost section of the cross-section profile of the bumper reinforcement 12. The support span length for the hook member 40, this being the separation between the pipe nut 34 and the hole edges of the access hole 38 in the intermediate flanges 20C, 22C, is lengthened, and this also contributes to suppressing deformation of the hook member 40 due to load W.

In the vehicle front section structure 10, exhibition of the operation and advantageous effect described above is realized through employing the bumper reinforcement 12 of two member configuration in which the inner panel 20 that is a press formed component is used. The press forming has high degrees of freedom for profiling. Namely, with a component produced by rolling, there are low degrees of freedom for profile setting since a uniform cross-section profile needs to be employed along the length direction. In contrast thereto, in the bumper reinforcement 12, by making the inner panel 20 as a press formed component, a configuration is realized in which the top-bottom dimension of the indented portion 12N varies locally. A B-shaped closed cross-section structure is also realized by adopting the two member configuration with the outer panel 22 joined to the inner panel 20.

In the exemplary embodiment described above, an example has been given in which the top-bottom dimension of the indented portion 12N is locally enlarged for a length direction portion of the bumper reinforcement 12. However the present invention is not limited thereto and, for example, a configuration with constant top-bottom dimension may be adopted for the indented portion 12N.

In the exemplary embodiment described above, an example has been given in which the joint portions Ji are disposed at the vehicle width direction outside of the pipe nut 34, however the present invention is not limited thereto. For example, a configuration in which the pipe nut 34 is disposed at the vehicle width direction outside of the joint portions Ji may be adopted.

In the exemplary embodiment described above, an example has been given in which the curved portion 20B of the lower wall 20WL is also set at the side of the end portion of the bumper reinforcement 12 where the pipe nut 34 is not disposed, however the present invention is not limited thereto. For example, a configuration in which there is no curved portion 20B of the lower wall 20WL set on the side of the end portion of the bumper reinforcement 12 where the pipe nut 34 is not disposed may be adopted. The joint structure of the bumper reinforcement 12 to the crush boxes 18 is preferably also made left-right symmetrical in such a configuration.

In the exemplary embodiment described above, an example has been given in which the fastening structure including the weld nuts 30 and the bolts 32 is employed as the joining unit, however the present invention is not limited thereto, and another joining unit may be employed, such as welding.

In the exemplary embodiment described above, an example has been given in which the bumper reinforcement 12 is joined to the crush boxes 18, however the present invention is not limited thereto. For example, in a configuration lacking the crush boxes 18, a configuration may be adopted in which the bumper reinforcement 12 is directly joined to the front side members 16 serving as framework members.

In the exemplary embodiment described above an example has been given in which the present invention is applied to the vehicle front section structure 10, however the present invention is not limited thereto. For example, the present invention may be applied to a vehicle rear section structure for joining bumper reinforcement of a rear bumper to a vehicle body framework member.

It is also obviously possible to implement the present invention with other appropriate modifications with in a range not departing from the scope of the present invention.

The invention claimed is:

1. A vehicle end section structure comprising:
   a bumper reinforcement comprising an outside member and an inside member having respective length directions along a vehicle width direction, with the inside member joined, at a vehicle front-rear direction center side, to the outside member such that an indented portion opening towards the center side is formed between a pair of closed cross-section portions that are formed and separated from each other in the vehicle top-bottom direction;
   a framework member of closed cross-section structure, having a length direction along a vehicle front-rear direction and being disposed at one length direction end side of the bumper reinforcement on an inside member side in the vehicle front-rear direction;
   a top and bottom pair of joining units that join the bumper reinforcement, at portions of the inside member configuring the respective pair of closed cross-section portions, to the framework member at portions positioned inside a closed cross-section of the framework member as viewed along the vehicle front-rear direction; and
   a hook attachment section fixed to a front end side of the framework member and being configured to be accessible along the vehicle front-rear direction via through holes that are formed at portions of the inside member and the outside member which configure an indentation-bottom of the indented portion, wherein the joining units and the hook attachment section are disposed offset from each other in the vehicle width direction, the portion of the inside member forming the indented portion is formed larger in the top and bottom direction at a placement area of the hook attachment section than at other portions of the indented portion, and a portion, in the vehicle front-rear direction, of the hook attachment section is inserted inside the indented portion.

2. The vehicle end section structure of claim 1 wherein:

the bumper reinforcement is configured such that the portions of the inside member and the outside member which configure the indentation-bottom of the indented portion are positioned at a vehicle front-rear direction outside end portion of the bumper reinforcement; and dimensions and shape of the through holes are set such that, when a top-bottom direction load of a specific value or greater acts on a hook member attached to the hook attachment section, a portion of the load is supported by a hole edge of the through hole formed at portions of the inside member.

3. The vehicle end section structure of claim 1, wherein a portion of the bumper reinforcement is formed larger in the top-bottom direction, which portion overlaps in the vehicle width direction with the portion of the inside member where the indented portion is formed larger in the top-bottom direction, and the top and bottom pair of joining units is disposed at the portion that is formed larger in the bumper reinforcement.

* * * * *